(12) United States Patent
Hwang et al.

(10) Patent No.: US 9,204,594 B2
(45) Date of Patent: Dec. 8, 2015

(54) LAWN MOWER ROBOT AND METHOD OF PROGRAMMING A LAWN PRESENCE REGION INTO MEMORY

(75) Inventors: Geunbae Hwang, Seoul (KR); Jongjin Woo, Seoul (KR); Dongkyun Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 13/565,277

(22) Filed: Aug. 2, 2012

(65) Prior Publication Data

US 2013/0192185 A1 Aug. 1, 2013

(30) Foreign Application Priority Data

Aug. 3, 2011 (KR) .................. 10-2011-0077455

(51) Int. Cl.
*A01D 34/00* (2006.01)
(52) U.S. Cl.
CPC ............. *A01D 34/008* (2013.01); *Y10S 901/01* (2013.01)
(58) Field of Classification Search
USPC ................ 56/10.2 R, 10.2 A, DIG. 7; 701/50
See application file for complete search history.

(56) References Cited

U.S. PATENT DOCUMENTS

| | | | |
|---|---|---|---|
| 3,550,714 A * | 12/1970 | Bellinger | 180/168 |
| 3,924,389 A * | 12/1975 | Kita | 56/10.2 A |
| 4,994,970 A * | 2/1991 | Noji et al. | 701/25 |
| 5,204,814 A | 4/1993 | Noonan | |
| 5,974,347 A | 10/1999 | Nelson | |
| 6,653,796 B2 * | 11/2003 | Kimura | 315/169.3 |
| 7,185,478 B1 * | 3/2007 | Willis, II | 56/10.2 A |
| 2002/0104300 A1 * | 8/2002 | Hunt | 56/10.6 |
| 2003/0226340 A1 * | 12/2003 | Havermans et al. | 56/10.2 R |
| 2004/0085037 A1 | 5/2004 | Jones et al. | |
| 2007/0294991 A1 * | 12/2007 | Medina et al. | 56/11.9 |

FOREIGN PATENT DOCUMENTS

KR 100189345 B1 6/1999

* cited by examiner

*Primary Examiner* — Alicia Torres
(74) *Attorney, Agent, or Firm* — Dentons US LLP (57) ABSTRACT

A lawn mower robot includes a body including a mowing device; a sensor disposed in the body and sensing light signal produced from a signal producing unit in the outside; a moving device disposed in the body; and a controller controlling the moving device based on information sensed from the sensor, wherein the controller controls the moving device so that the lawn mower robot is moved along the light signal.

9 Claims, 6 Drawing Sheets

LAWN MOWER ROBOT AND METHOD OF PROGRAMMING A LAWN PRESENCE REGION INTO MEMORY

CROSS-REFERENCE TO RELATED APPLICATION

The present application claims priority under 35 U.S.C. 119 and 35 U.S.C. 365 to Korean Patent Application No. 10-2011-0077455 (filed on Aug. 3, 2011), which is hereby incorporated by reference in its entirety.

BACKGROUND

The present disclosure relates to a lawn mower robot and a method of controlling the same.

A lawn mower is an apparatus for mowing lawns planted in a home's yard or playground and the like. Such a lawn mower may be classified into a type used at home, and a tractor type used in a wide playground and farm.

The lawn mower for the home is classified into a walk behind type for mowing the lawn while directly dragging the lawn mower from behind, and a directly hand carrying type.

However, there are burdens in that humans should directly operate all of two types of the lawn mower. Particularly, since it is difficult to mow the lawn of the playground by directly operating the lawn mower by an user in today's busy daily life, it is generous to hire outside humans so as to mow the lawns, thereby to generate hiring cost.

SUMMARY

Embodiments provide a lawn mower robot system, a lawn mower robot, and a method of controlling the same.

In one embodiment, a lawn mower robot system comprises: a boundary display apparatus having a signal producing unit for producing signal; and a robot including a mowing device that mows lawns, a sensor that senses the signal produced from the signal producing unit, a moving device to move the robot, and a controller to control the moving device based on the result sensed from the sensor, wherein the controller controls the moving device so that the robot is moved toward the boundary display apparatus when the sensor senses the signal produced from the signal producing unit.

In another embodiment, a lawn mower robot comprises: a body including a mowing device; a sensor disposed in the body and sensing light signal produced from a signal producing unit in an outside of the body; a moving device disposed in the body; and a controller that controls the moving device based on information sensed from the sensor, wherein the controller controls the moving device so that the body is moved along the light signal.

In further another embodiment, a method of controlling a lawn mower robot comprises: moving a robot; and moving a robot along light signal when a sensor senses light signal during moving the robot.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

Figure 1:
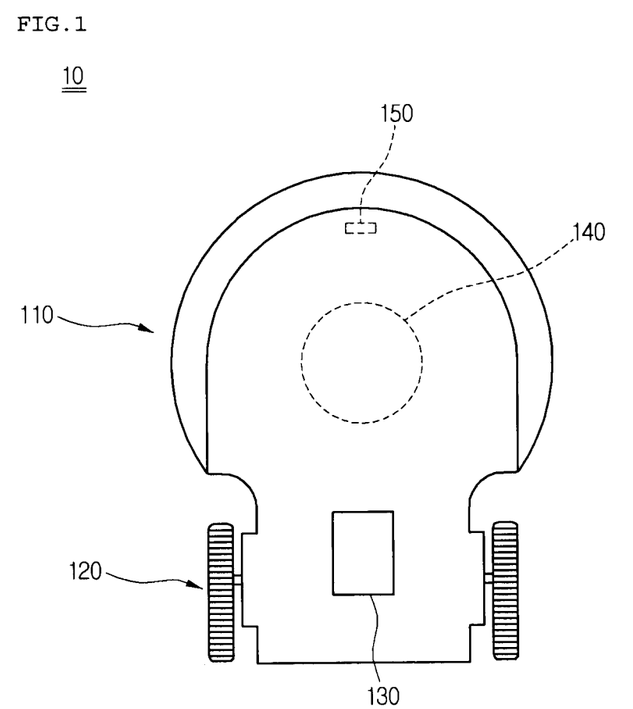
FIG. 1 is a plan view for a lawn mower robot according to one embodiment.
Figure 2:
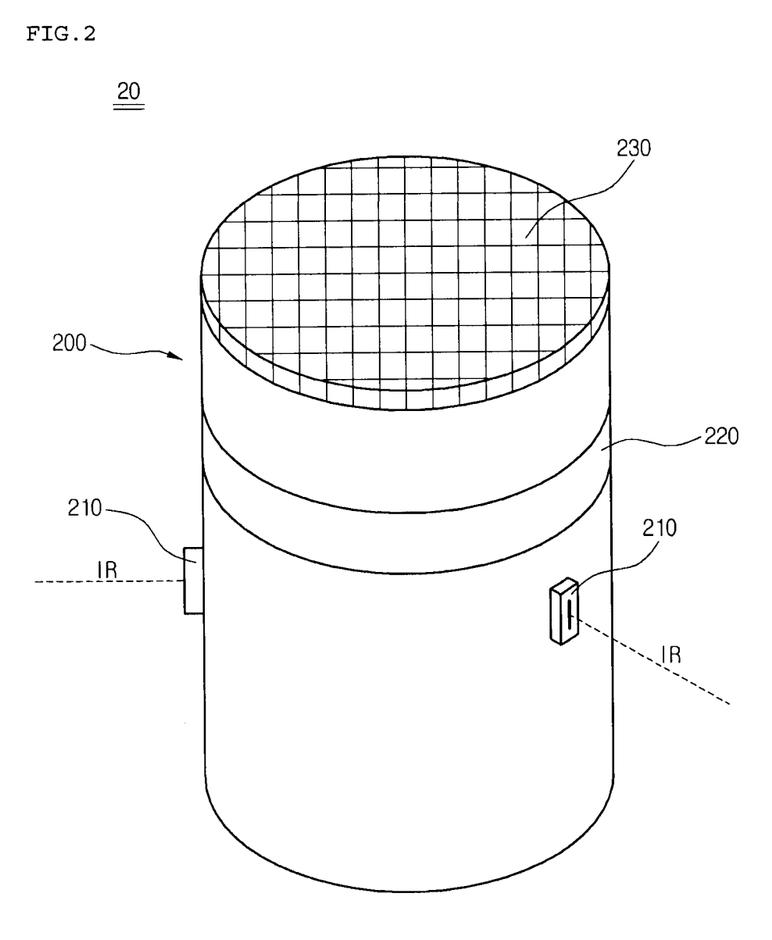
FIG. 2 is a perspective view for boundary display apparatuses according to the present embodiment.
Figure 3:
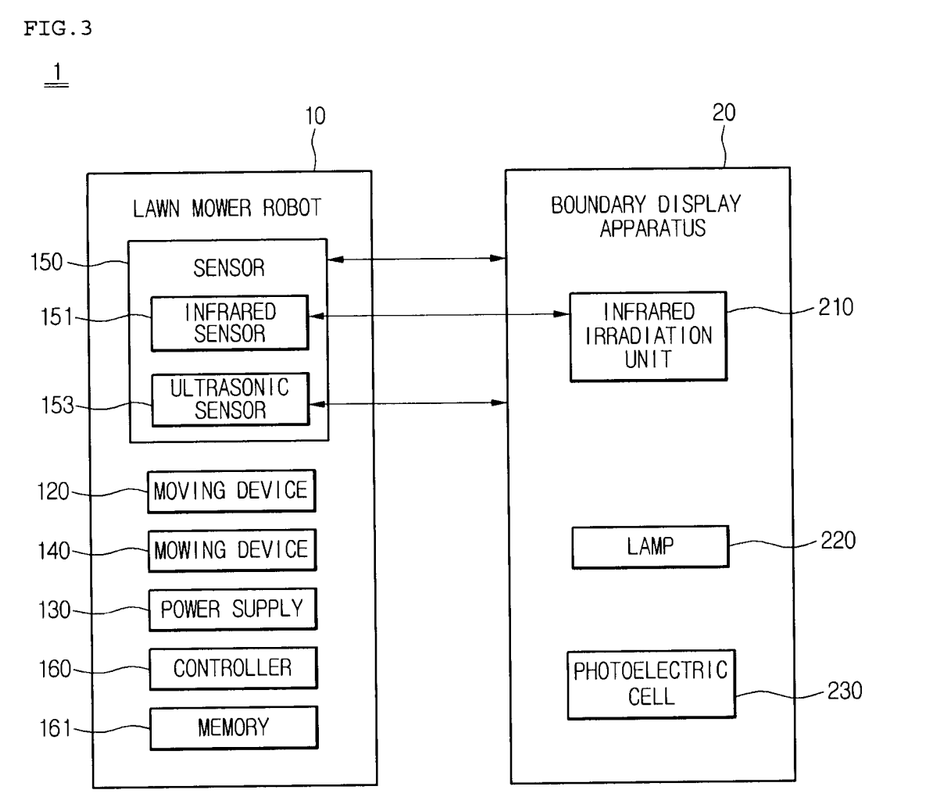
FIG. 3 is a block view for a lawn mower robot system according to the present embodiment.

FIG. 1 is a plan view for a lawn mower robot according to the present embodiment, FIG. 2 is a perspective view for boundary display apparatuses according to the present embodiment, and FIG. 3 is a block view for the lawn mower robot system according to the present embodiment.

Referring to FIG. 1 to 3, the lawn mower robot 10 according to the present embodiment includes a body 110 having a moving device 120 and forming an appearance, a mowing device 140 disposed in a bottom of the body 110 and mowing lawns, a sensor 150 disposed in the body 110 and sensing outside information, a power supply 130 supplying power to the lawn mower robot 10, and a controller 160 disposed in the body 110 and controlling various electronic parts.

The body 110 forms the appearance of the lawn mower robot 10, and various electrical/mechanical parts are received in the inside thereof.

The power supply 130 may be a chargeable and dischargeable battery (second cell). The power supply 130 may be charged by outside power. The power supply 130 may be implemented by a replaceable primary cell, and is connected to the outside through lines to receive commercial power supply. Hereinafter, although it is described that the power supply 130 is implemented by the second cell, it is not limited thereto.

The power supply 130 is separately coupled with the body 110, or may be detachably connected to a charging device (not shown) to be supplied with outside current. In this case, the charging device is connected to the outside power to supply current, the charging device is interactively communicated with the lawn mower robot 10 such that the lawn mower robot 10 returns to the charging device for oneself to charge the power supply 130.

The moving device 120 may move the lawn mower robot 10. The moving device 120 may include a plurality of wheels, and a plurality of motors for separately driving the plurality of wheels. Rotation velocities of the wheels between the plurality of wheels become different by separately controlling the plurality of motors such that direction switching is possible. Each of the plurality of motors is bidirectional rotating motors. Therefore, the lawn mower robot 10 may move forwarded or backward, or left or right.

The sensor 150 may sense objects in the vicinity of the lawn mower robot 10, and sense humans, animals, stationary objects or moving objects and the like.

The sensor 150 may also sense outside temperature or humidity, sunshine intensity, air volume and the like.

The sensor 150 may sense presence or absence of the lawns. The sensor 150 may be implemented by the sensor for sensing at least one of color, perfume and spectrum of the lawns.

The sensor 150 may include at least one of a mechanical sensor, an optical sensor, a chromatic sensor, a radio frequency sensor, a capacitive sensor, an ultrasonic sensor, an infrared ray sensor, a RGB sensor, a spectrum sensor and the like according to the embodiment.

Hereinafter, for example, it is described that the sensor 150 includes an infrared ray sensor 151 for sensing an infrared ray, and an ultrasonic sensor 153 for sensing presence or absence of the boundary display apparatuses 20, but it is limited thereto.

The mowing device 140 is disposed in the body 110, and therefore, mows the lawns. The mowing device 140 is disposed in the bottom of the body 110, thereby to dispose toward the region having the lawn (hereinafter, refer to 'the lawn presence region G'). When the mowing device 140 is driven by a controller 160, the lawns in the lawn presence region G are mowed.

The mowing device 140 may be implemented by a blade type, a circle blade type, a reel type, a line or strand type formed with a cutter with rope, and other well-known cutter and the like.

The controller 160 controls all of the electronic/mechanical devices disposed in the lawn mower robot 10. The controller 160 may control above-described moving device 120 and mowing device 140. Further, the controller 160 receives data sensed from the sensor 150 and the like, then, may store it into a memory 161, and may control the electronic/mechanical devices disposed in the lawn mower robot 10 based on the stored data.

On the one hand, the boundary display apparatuses 20 according to the present embodiment include a housing 200 forming the appearance, a photoelectric cell 230 disposed in the housing 200 and producing the current by receiving light, and an infrared ray irradiation unit 210 disposed in the housing 200 and irradiating the infrared ray using the current produced from the photoelectric cell 230. The infrared ray irradiation unit 210 may be called a signal production unit for producing the signal. Of course, the signal production unit of the present embodiment may produce various light signal except the infrared ray, and the sensor may sense various light signal.

The housing 200 forms the appearance of the boundary display apparatuses 20. The housing 200 may function as an ornament for a graceful landscape according to the embodiment, and may be formed in various shapes.

In FIG. 2, for example, it is showed that the housing 200 is formed in a cylindrical shape, but it is not limited thereto.

The photoelectric cell 230 receives the light to produce the current. The photoelectric cell 230 may be disposed in the side or top of the housing 200.

The photoelectric cell 230 may be implemented by a sunlight cell 230 for producing the current by receiving sunlight, but the kind of the photoelectric cell 230 is not limited. The current produced from the photoelectric cell 230 may be stored in a power storage unit (not shown) disposed in the housing 200.

The infrared ray irradiation unit 210 is disposed to allow the infrared ray to be irradiated into the outside of the housing 200, and the housing 200 may be disposed with a plurality of the infrared ray irradiation units 210. Hereinafter, for example, it is described that two infrared irradiation units 210 are spaced by a predetermined angle apart from each other in the housing 200, but the number of the infrared irradiation unit is not limited.

The infrared irradiation unit 210 irradiates the infrared ray into the outside of the housing 200 using the current produced from the photoelectric cell 230. The infrared ray to be irradiated is irradiated in a straight line from the infrared irradiation unit 210 or may be irradiated in a predetermined angle and range. Hereinafter, it is described that the infrared irradiation unit 210 irradiates the infrared ray in a straight line, but the infrared ray may be irradiated on the two dimensional plan or three dimensional space in a predetermined range and angle.

The boundary display apparatuses 20 are disposed with a lamp 220 emitting the light. The lamp 220 is turned off by day, and may be operated at night. The lamp 220 may be operated using the current produced from the photoelectric cell 230.

As the boundary display apparatuses 20 produce the current using the photoelectric cell 230, the lawn presence region G to be described later may be displayed by irradiating the infrared ray from the infrared irradiation unit 210 by day, and the operated lamp 220 may be used as a lighting that allows the landscape of the lawn presence region G to be graceful at night.

Figure 4:
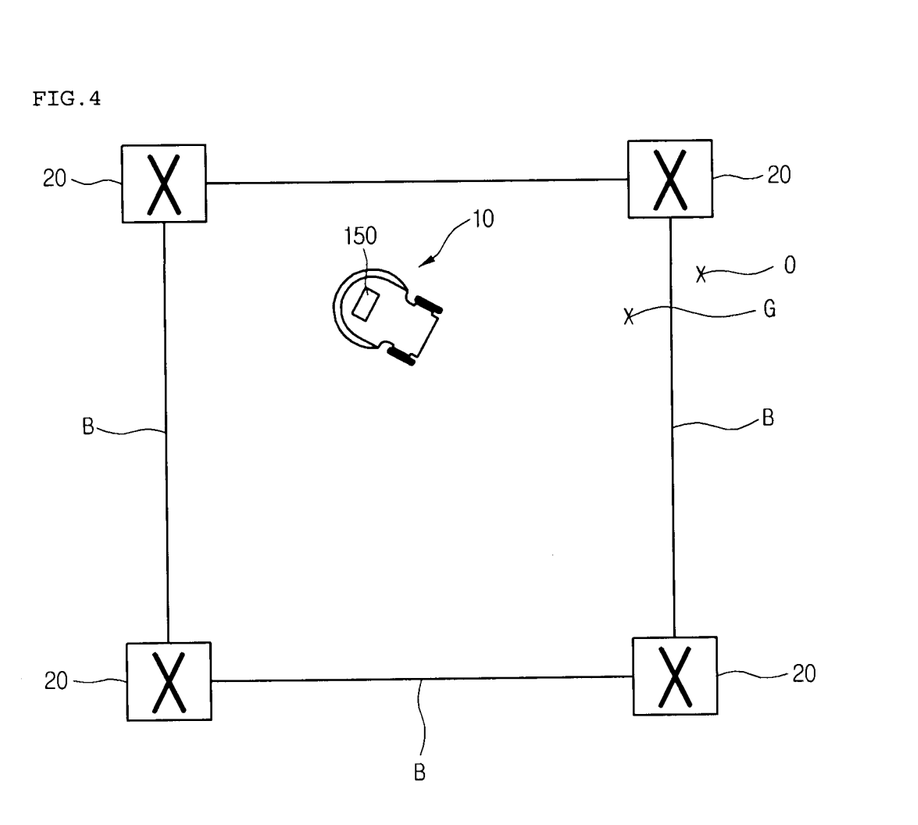
FIG. 4 is a view for the lawn mower robot system and a lawn presence region G according to the present embodiment.

FIG. 4 is a view for the lawn mower robot system and the lawn presence region G according to the present embodiment.

Referring to FIGS. 3 and 4, the lawn presence region G is defined as the region having the lawn. The region having the lawn is generally partitioned into the lawn mowing region in a certain area to distinguish from different area in home or industrial environment. In this case, a boundary area B separates the lawn presence region G and the other remaining area O. The boundary area B may form an enclosed path.

Some lawns may be present even on the other remaining region O having not the lawns, but, hereinafter, it is described that a lot of lawns are present in the lawn presence region G on the basis of the boundary area B and the other remaining region O includes soil, concrete, block, road and the like having little lawn or plants.

In FIG. 4, for an example, the lawn presence region G is defined as a rectangle by four boundary display apparatuses 20, but it is not limited thereto.

The boundary display apparatuses 20 display the boundary area B of the lawn presence region G by the infrared ray irradiated from the infrared irradiation unit 210. The boundary display apparatuses 20 form apexes of each of the rectangle, the infrared ray irradiated from each of the infrared ray irradiation unit 210 forms a segment of the rectangle, and the rectangle including the segment and the apex forms the boundary area B. At this time, the region in the inside of the boundary area B becomes the lawn presence region G.

The sensor 150 may include the infrared ray sensor 151, and the infrared ray sensor 151 may sense the infrared ray irradiated from the infrared irradiation unit 210. The sensor 150 senses the infrared ray while moving in the lawn presence region G and transmits the sensed result to the controller 160.

The sensor 150 may include the ultrasonic sensor 153, and the ultrasonic sensor 153 may sense presence or absence of the boundary display apparatuses 20. When the sensor 150 meets the boundary display apparatuses 20 while moving in the lawn presence region G, the presence or absence of the boundary display apparatuses 20 is sensed, and therefore, the sensed result is transmitted to the controller 160.

The controller 160 controls the moving device 120 and/or the mowing device 140 according to the sensed result of the sensor 150. When the controller 160 receives the sensed result of the infrared ray, the controller 160 may control to allow the moving device 120 to be moved along the boundary area B formed by the infrared ray.

Further, when the controller 160 receives the sensed result of the sensor 150 for the boundary display apparatuses 20 and it is determined that the boundary display apparatuses 20 are present closely, the controller 160 may control the moving device 120 to enter into the directing switching mode to be described later.

Figure 5:
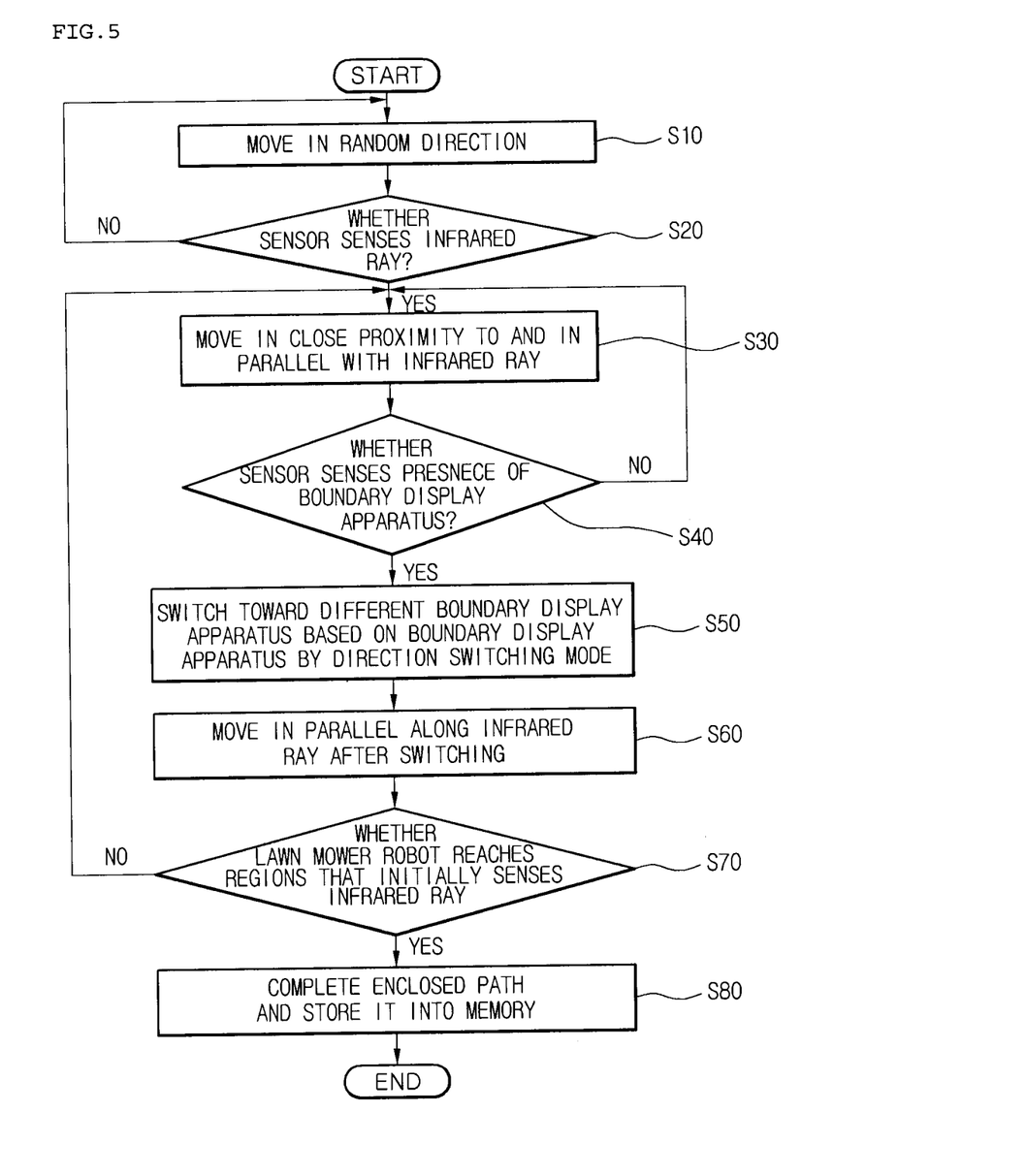
FIG. 5 is a flow chart for describing a method of controlling the lawn mower robot system according to the present embodiment.
Figure 6:
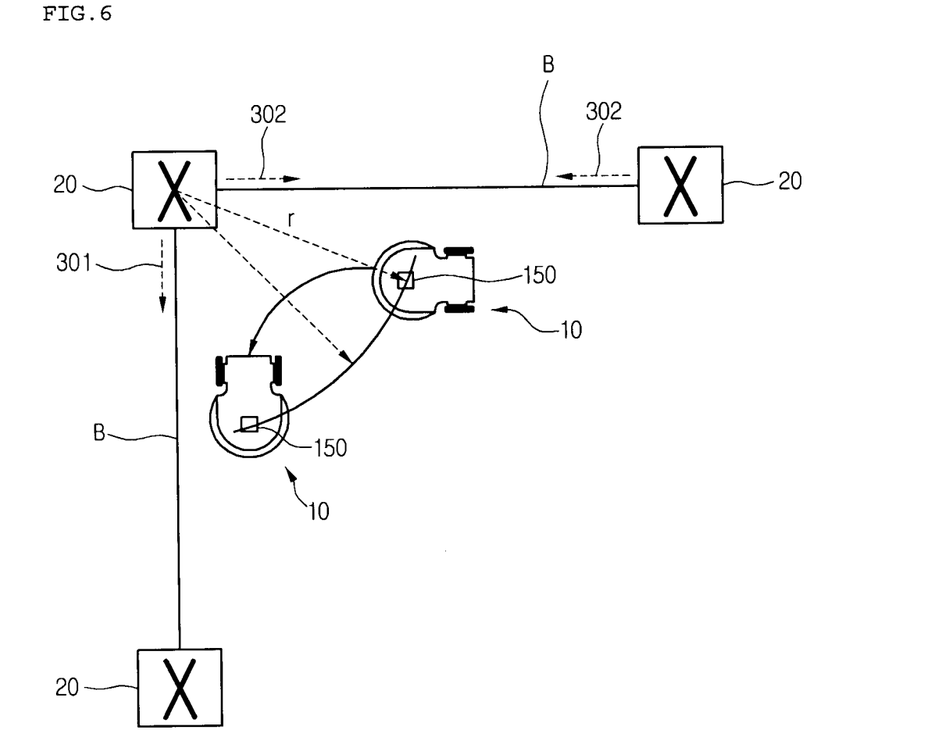
FIG. 6 shows that the lawn mower robot according to the present embodiment is controlled by a direction switching mode in close proximity to the boundary display apparatuses.

FIG. 5 is a flow chart for describing the method of controlling the lawn mower robot system according to the present embodiment. FIG. 6 shows that the lawn mower robot according to the present embodiment is controlled by the direction switching mode in close proximity to the boundary display apparatuses.

Referring to FIG. 4 to 6, the method of controlling the lawn mower robot system 1 is described.

First, the lawn mower robot 10 moves in a random direction (S10). The lawn mower robot 10 disposed in the lawn presence region G moves in the random direction, the lawn mower robot is moved into the inside of the lawn presence region G and is disposed in the lawn presence region G by the setting such as manual operations of an user or an initial driving mode. The sensor 150 disposed in the lawn presence region G is turned on.

On moving in the random direction, the controller 160 determines whether the sensor 150 senses the infrared ray irradiated from the boundary display apparatuses 20 (S20). When it is determined that the infrared ray is sensed, the controller 160 controls the moving device 120 such that the lawn mower robot is moved in parallel with the boundary formed by the infrared ray (S30). That is, the lawn mowing robot is moved toward the boundary display apparatuses 20 for irradiating the infrared ray. The lawn mowing robot is moved along the infrared ray irradiated from other side At this time, the area initially sensed with the infrared ray is stored into the memory. The lawn mowing robot in the present embodiment may be moved along the boundary formed by the infrared ray, and this movement may become a linear movement or a linear and curved movement. Merely, the curved movement in the present embodiment may mean the movement of the type similar to the linear movement.

The lawn mowing robot may approach at least one boundary display apparatus 20 disposed in corners of the lawn presence region G on moving in parallel with the infrared ray. The controller 160 determines whether the ultrasonic sensor 153 senses the boundary display apparatuses 20 (S40).

When it is determined that the boundary display apparatuses 20 are sensed, the controller 160 switches the lawn mowing robot on the basis of the boundary display apparatuses 20 (S50) (it becomes the direction switching mode).

The movement for the lawn mowing robot in the direction switching mode is showed in FIG. 6. In the direction switching mode, the lawn mower robot 10 is switched by the ultrasonic sensor 153 in the state for maintaining the distance between the lawn mower robot 10 and the boundary display apparatuses 20 beyond a certain distance.

In the direction switching mode, the moving device 120 may be controlled so that the lawn mower robot is rotated by the angle formed by the infrared ray 301 in the one side and the infrared ray 302 in the other side irradiated from the boundary display apparatuses 20. Or, when the moving device 120 starts the direction switching and the infrared ray 302 in the other side is sensed, the direction switching may be ended.

As shown in FIG. 4, in the case that the lawn presence region G is implemented by the rectangle, the moving device 120 may be controlled to be substantially rotated by 90 degrees on the basis of the boundary display apparatuses 20. The range of the angle for allowing the lawn mower robot 10 to be rotated may be varied according to the shape of the lawn presence region G and the number of the boundary display apparatuses 20.

The range of the angle for allowing the lawn mower robot 10 to be rotated may be automatically set or manually set by the user.

When the lawn mower robot 10 is switched, the lawn mower robot 10 is positioned in parallel with the infrared ray 302 in the other side. In such a state, the controller 160 controls the moving device 120 so that the lawn mower robot is moved along the boundary area B formed by the infrared ray 302 in the other side toward different boundary display apparatuses 20.

After the lawn mower robot is switched and moved as above on the basis of one boundary display apparatuses 20, when the sensor 150 senses different one boundary display apparatuses 20, the above-described direction switching mode is implemented again.

The controller 160 determines whether the lawn mower robot reaches the region that initially senses the infrared ray while moving in parallel along the infrared ray (S70).

When the lawn mower robot does not reach the region that initially senses the infrared ray, it moves in parallel with the infrared ray, and when it senses the boundary display apparatuses 20, the above-described direction switching mode is repeatedly implemented.

When the lawn mower robot 10 to be moved reaches the region that initially senses the infrared ray, an enclosed path is stored into the memory 161, thereby to end a mapping(S80). In the embodiment of FIG. 4, an enclosed path for the rectangle is stored into the memory 161, the enclosed path coincides with the boundary area B formed by the boundary display apparatuses 20.

The lawn mower robot 10 that subjects to the above-described step and ends the mapping recognizes the stored boundary area B and mows the lawn while traveling in a certain pattern in the lawn presence region G within the boundary area B. Traveling patterns may be patterns preset with the path or random patterns.

In the present embodiment as above, as the lawn mower robot senses the boundary area displayed by the boundary display apparatuses, the lawn mower robot may mow the lawn in the lawn presence region for oneself, thereby to solve the burden of a user.

Further, as the boundary display apparatuses produce the current using the photoelectric cell, the boundary area may be displayed by irradiating the infrared ray from the infrared irradiation unit by day, and the lamp to be turned on may be used as a lighting that allows the landscape of the lawn presence region to be graceful at night.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lawn mower robot system, comprising:
   a plurality of boundary display apparatuses, each of the plurality of boundary display apparatuses having a signal producing unit for producing a signal; and
   a robot including a mowing device that mows lawns, a first sensor that senses the signal produced from at least one of the signal producing units, a second sensor to sense a presence of at least one of the plurality of boundary display apparatuses, a moving device to move the robot, and a controller to control the moving device based on results sensed by the first and second sensors,
   wherein the controller:
   controls the moving device to move the robot in a random direction,
   senses a first signal from one of the plurality of boundary display apparatuses with the first sensor and, in response, controls the moving device to move the robot in close proximity and parallel to the first signal,
   senses the presence of the boundary display apparatus of the sensed first signal with the second sensor and, in response, controls the moving device of the robot to change a moving direction until a second signal from another boundary display apparatus is sensed by the first sensor and, in response, controls the moving device to move the robot in close proximity and parallel to the second signal,
   repeating the sensing of the plurality of boundary display apparatus signals and presences with the first and second sensors, respectively, until the controller determines the robot has reached an initial sensing position of the first signal, wherein when the initial sensing position of the first signal is sensed controlling the robot to store the previous moving path into a memory; thereafter moving the robot in a region formed by the stored path while mowing the lawn.

2. The lawn mower robot system according to claim 1, wherein the signal produced from each of the signal producing units is a light signal.

3. The lawn mower robot system according to claim 2, wherein the light signal is an infrared ray, and the first sensor includes an infrared ray sensor.

4. The lawn mower robot system according to claim 1, wherein the second sensor includes an ultrasonic sensor for sensing the presence or absence of at least one of the boundary display apparatuses.

5. The lawn mower robot system according to claim 1, wherein at least one of the boundary display apparatuses includes a photoelectric cell receiving light and producing current by the received light, and at least one of the signal producing units of at least one of the boundary display apparatuses produces the signal using the current produced from the photoelectric cell, wherein the photoelectric cell is exposed to an outside of the at least one of the boundary display apparatuses.

6. The lawn mower robot system according to claim 1, wherein a lawn presence region is defined by the plurality of boundary display apparatuses, and the robot mows the lawn while moving in the lawn presence region.

7. The lawn mower robot system according to claim 1, wherein at least one of the boundary display apparatuses further includes a lamp for emitting light.

8. A lawn mower robot, comprising:
   a body including a mowing device;
   a first sensor disposed in the body and sensing a light signal produced from at least one of a plurality of boundary display apparatuses outside of the body;
   a second sensor disposed in the body and sensing a presence of at least one of the plurality of boundary display apparatuses;
   a moving device disposed in the body; and
   a controller to control the moving device based on information sensed by the first and second sensors,
   wherein when the first sensor senses a first light signal produced from one of the plurality of boundary display apparatuses, the controller controls the moving device to move the robot along the first light signal,
   wherein the second sensor senses the presence of the boundary display apparatus of the sensed first signal and, in response, the controller controls the moving device of the robot to change a moving direction until a second signal from another boundary display apparatus is sensed by the first sensor and, in response, controls the moving device to move the robot in close proximity and parallel to the second signal,
   repeating the sensing of the plurality of boundary display apparatus signals and presences with the first and second sensors, respectively, until the controller determines the robot has reached an initial sensing position of the first signal, wherein when the initial sensing position of the first signal is sensed controlling the robot to store the previous moving path into a memory; thereafter moving the robot in a region formed by the stored path while mowing the lawn.

9. The lawn mower robot according to claim 8, wherein the first sensor includes an infrared ray sensor for sensing the first and second light signal.

* * * * *